(12) United States Patent
Qiao

(10) Patent No.: US 10,297,971 B2
(45) Date of Patent: May 21, 2019

(54) OPTICAL AMPLIFIER

(71) Applicant: Lijie Qiao, Ottawa (CA)

(72) Inventor: Lijie Qiao, Ottawa (CA)

( * ) Notice: Subject to any disclaimer, the term of this patent is extended or adjusted under 35 U.S.C. 154(b) by 119 days.

(21) Appl. No.: 15/481,529

(22) Filed: Apr. 7, 2017

(65) Prior Publication Data

US 2017/0294759 A1 Oct. 12, 2017

Related U.S. Application Data

(60) Provisional application No. 62/320,559, filed on Apr. 10, 2016, provisional application No. 62/324,433, filed on Apr. 19, 2016.

(51) Int. Cl.
| | |
|---|---|
| *H01S 3/08* | (2006.01) |
| *H01S 3/10* | (2006.01) |
| *H01S 3/16* | (2006.01) |
| *H01S 3/067* | (2006.01) |
| *H01S 3/0941* | (2006.01) |

(52) U.S. Cl.
CPC ...... *H01S 3/10023* (2013.01); *H01S 3/06754* (2013.01); *H01S 3/06758* (2013.01); *H01S 3/06787* (2013.01); *H01S 3/08059* (2013.01); *H01S 3/08095* (2013.01); *H01S 3/0941* (2013.01); *H01S 3/10015* (2013.01); *H01S 3/1608* (2013.01)

(58) Field of Classification Search
CPC ............. H01S 3/06754; H01S 3/06758; H01S 3/06787; H01S 3/10023
See application file for complete search history.

(56) References Cited

U.S. PATENT DOCUMENTS

| | | | | |
|---|---|---|---|---|
| 6,236,498 | B1 * | 5/2001 | Freeman | H01S 3/094003 359/337.1 |
| 6,256,139 | B1 * | 7/2001 | Fujii | H01S 3/06708 359/341.1 |
| 6,961,502 | B1 * | 11/2005 | Wysocki | G02B 6/125 385/129 |
| 2002/0105720 | A1 * | 8/2002 | Minelly | H01S 3/06754 359/341.1 |
| 2006/0082867 | A1 * | 4/2006 | Starodoumov | H01S 3/06758 359/337 |
| 2009/0201576 | A1 * | 8/2009 | Bolshtyansky | H01S 3/06754 359/341.33 |

* cited by examiner

*Primary Examiner* — Eric L Bolda
(74) *Attorney, Agent, or Firm* — Teitelbaum Bouevitch & McLachlen; Neil Teitelbaum

(57) ABSTRACT

A multi-stage optical amplifier has an input port for receiving an optical signal and a relatively short erbium doped optical fiber is coupled to the input port. Complex costly pump feedback is not required as a constant non-varying saturation pump is configured to provide non varying output power pump light of a predetermined wavelength suitable for excitation and full saturation of the erbium ions such that a full population inversion occurs. The length of the short erbium doped fiber and rare earth doping concentration of the erbium doped fiber is such that when pumped by said pump provides amplification of the optical signal of less than 15 dB. Locating a gain flattening filter after the short erbium doped optical fiber provides a relatively flat amplified output signal. Multi-stages of similar short erbium doped fibers pumped and saturated by the same pump signal economically provide increased amplification of the signal and filters after each state flatten the gain.

5 Claims, 20 Drawing Sheets

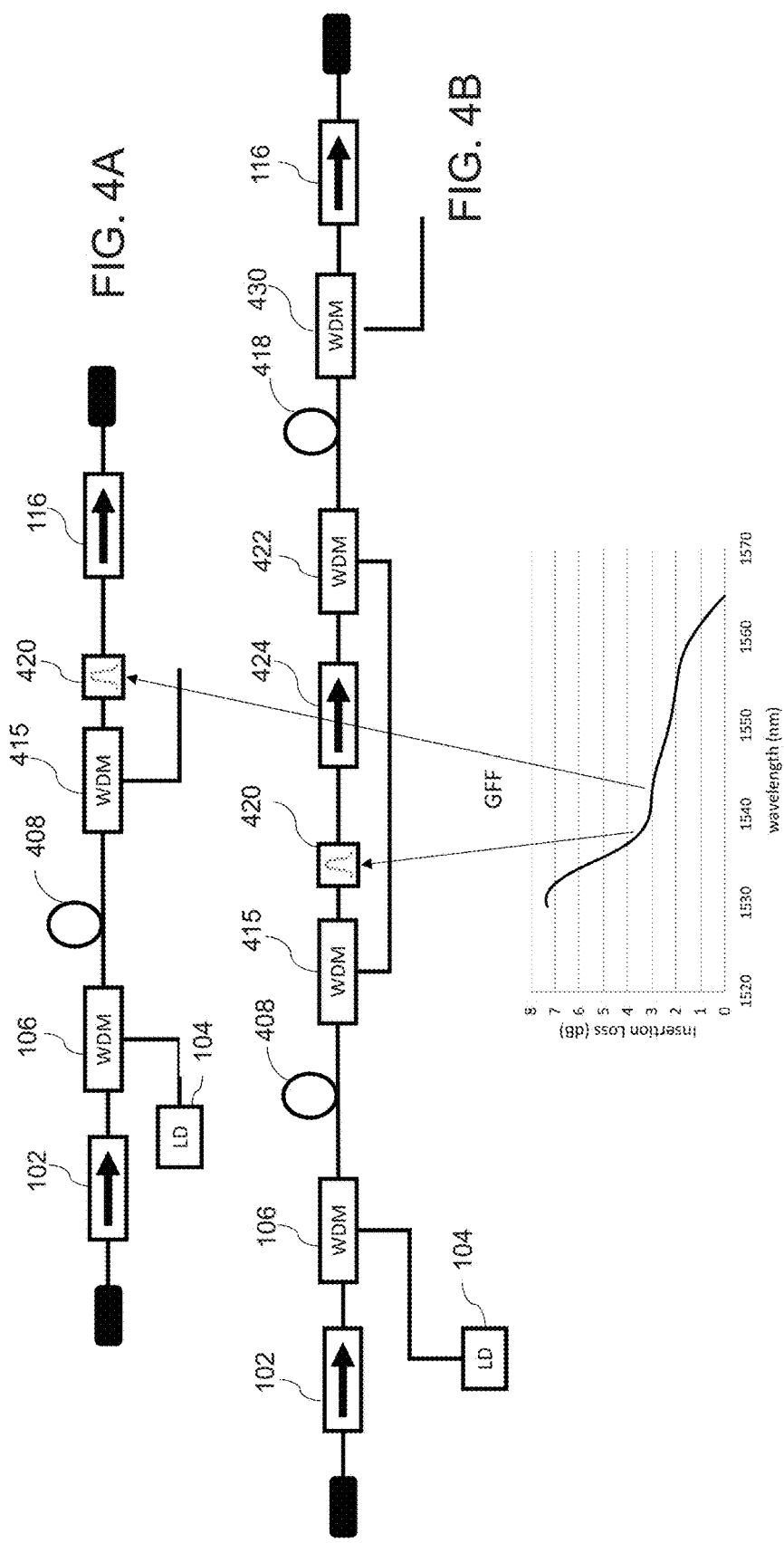

200
OPTICAL AMPLIFIER

CROSS REFERENCE TO RELATED APPLICATIONS

The present invention claims priority from U.S. Patent Application No. 62/320,559 filed Apr. 10, 2016 and U.S. Patent Application No. 62/324,433 filed Apr. 19, 2016, which are incorporated herein by reference.

TECHNICAL FIELD

The present invention relates to an optical amplifier, and in particular to burst mode optical amplifiers and methods of suppression of transient performance within optical amplifiers.

BACKGROUND OF THE INVENTION

In a wavelength division multiplexing (WDM) optical transmission system, optical signals at a plurality of wavelengths are encoded with digital streams of information. These encoded optical signals, or optical channels, are combined together and transmitted through a series of spans of optical fiber comprising a transmission link of a WDM fiber optic network. At a receiver end of the transmission link, the optical channels are separated, whereby an optical receiver can detect each optical channel.

Light tends to lose power when propagating through an optical fiber. Yet, some minimal level of optical channel power is required at the receiver end to decode information that has been encoded in an optical channel at the transmitter end. To boost optical signals propagating in an optical fiber, optical amplifiers are deployed at multiple locations, known as nodes, along the transmission link. The optical amplifiers extend the maximum possible length of the link, in some instances, from a few hundred kilometers to several thousand kilometers, by amplifying optical signals to power levels close to the original levels of optical power at the transmitter end.

A rare earth doped optical fiber such as an erbium-doped fiber amplifier (EDFA) is one of the most practical types of optical amplifiers employed in many modern fiber-optic networks. A single EDFA module can amplify up to about a hundred optical channels at a time, thus providing significant cost savings. When continuous wave signals are transmitted, for example in PON systems conventional optical amplifiers are typically used. However in systems where the distances between and optical line terminal (OLT) and each optical network unit (ONU) differ, the OLT must be able to receive optical burst signals with different intensities from the ONUs. Furthermore the PON repeater based on optical amplifiers must be able to amplify these signals without any distortion. Unfortunately, optical burst signal amplification leads to optical surges, which may well cause failure of the optical receiver as well as interfering with the reception of normal signals at the OLT due to gain dynamics.

As a result burst-mode optical amplifiers are required which suppress these optical surges and provide gain stabilization.

Much work has been done to lessen the effects or reduce an EDFAs transient response and one method of lessening the unwanted effects is by gain clamping. Using EDFAs in burst mode is highly desirable, for example in communication systems such as NG-PON2.

There are numerous patents and publications related to gain clamped optical fiber amplifiers but they tend to be costly and none are perfect solutions to transient effects, especially those caused by burst-mode transmission.

It is an object of this invention to provide a cost effective optical amplifier, which does not require costly complex pump control or feedback circuitry to control output pump power.

SUMMARY OF THE INVENTION

In accordance with a broad aspect of the invention there is provided, an optical amplifier comprising:

an input port for receiving an optical signal for amplification and directing said optical signal within a rare earth doped material along a first rare earth doped optical path;

a pump configured to provide a pump light to the optical signal as it traverses the first rare earth doped optical path, wherein the pump is configured to provide optical pump light having a substantially constant output power, wherein the optical pump light has an output power sufficient to over saturate the rare earth doped ions along the first rare earth doped optical path such that a full population inversion occurs and wherein the first rare earth doped optical path has a length and doping concentration such that when pumped by said pump has an amplification of less than about 10 db to about 15 dB; and, a filter optically coupled to an the first rare earth doped path for providing gain flattening and/or for removing a remaining pump light. The optical path may be embodied within optical waveguide or may be a free space path within a doped block of light transmissive material. Notwithstanding the length and doping concentration of rare earth ions within the optical path of an amplifying section within the optical material is limited to a maximum amplification when fully saturated.

It is preferred that the optical pump light output power is sufficient to over saturate the first rare earth doped optical path such that a full population inversion occurs and wherein the rare earth path has a length and doping concentration such that when pumped by said pump provides a signal amplification of less than 15 dB and in some instances less than 10 dB, and wherein the filter is for removing a remaining pump signal from the amplified signal.

In a more preferred embodiment further a plurality of additional rare earth doped optical paths are serially optically coupled to one another such that when light is launched into the input port and along the first rare earth doped optical path it is filtered by a gain flattening filter and subsequently traverses one or more other rare earth doped optical paths; and, wherein the pump is configured to provide a substantially constant pump light so as to fully saturate the one or more other rare earth doped optical paths as the signal propagates therethrough such that a full population inversion occurs in said one or more optical paths. Ideally the first rare earth doped optical path is a length of erbium-doped fiber. Preferably one or more gain flattening filters are disposed between the rare earth doped amplifying paths.

In accordance with an aspect of the invention, optical amplifier is provided comprising:

an input port for receiving an optical signal; a first rare earth doped optical waveguide having a length L optically coupled to the input port; a pump configured to provide a pump light of a predetermined wavelength suitable for excitation of rare earth ions, said pump having a substantially non-varying output power and optically coupled to the first rare earth doped optical waveguide, said pump configured to fully saturate rare earth doped ions within the first rare earth doped waveguide such that a full population inversion occurs and wherein the length L and rare earth doping concentration of the first rare earth doped waveguide is such that when pumped by said pump provides amplification of the optical signal of less than 15 dB; and, a filter optically coupled to an the first rare earth doped waveguide for providing gain flattening and/or for removing a remaining pump light.

In accordance with the invention there is provided, an optical amplifier comprising: a plurality of rare earth doped waveguides serially optically coupled to one another such that when light is launched into a first rare earth doped waveguide, the light propagates through the plurality of other rare earth doped waveguides; and a pump having a constant output power that fully saturates the first rare earth doped optical waveguide and saturates the plurality of other rare earth doped optical waveguides such that a full population inversion occurs in said waveguides; and, a filter optically coupled to the rare earth doped waveguides for providing gain flattening and/or for removing a remaining pump signal.

In accordance with the invention there is further provided, an optical amplifier array comprising: a plurality of rare earth doped waveguides; a pump optically coupled to the optical waveguides configured to provide a substantially constant output power optical pump light to rare earth doped optical waveguides, wherein the output power optical pump light is sufficient to fully saturate the rare earth doped waveguides such that a full population inversion occurs and wherein the rare earth doped optical waveguides have a length and doping such that when pumped by said pump and fully saturated have an amplification of less than 15 dB; and, optical filters disposed between at least some of the rare earth doped waveguides for providing gain flattening and/or for removing a remaining pump signal.

In accordance with a broad aspect of the invention there is provided an optical amplifier comprising a glass block doped with rare earth ions having an input collimating lens for directing an input beam into the block, and wherein the input collimating lens or an end face of the block is angled such that light launched into the input collimating lens follows a zig-zag path within the block reflecting from between end faces of the glass block a plurality of times; and a pump for providing light of a constant output power for saturating rare earth ions within the block.

In accordance with another aspect of the invention, there is provided, an amplifying module for amplifying one or more optical signals when coupled to a pump signal, comprising: a gain flattening filter; "n" amplifying optical waveguides doped with rare earth ions for amplifying one or more optical signals propagating therethrough in the presence of pump light, said "n" amplifying optical waveguides optically coupled to the gain flattening filter, wherein n/2 pairs of the amplifying waveguides are arranged in series, wherein each amplifying waveguide within a pair is on an opposite side of the gain flattening filter from the other amplifying waveguide in the pair, wherein when signal light to be amplified is launched into an amplifying waveguide of each pair in the presence of pump light, some of said amplified signal light is attenuated by the filter and remaining amplified signal light is passed to the other amplifying optical waveguide in said pair, wherein n is equal to or greater than 4.

BRIEF DESCRIPTION OF THE DRAWINGS

Exemplary embodiments will now be described in conjunction with the drawings in which:

FIG. 4A is a schematic drawing of a gain clamped amplifier with over pumped short erbium doped fiber in accordance with this invention.

FIG. 4B is a schematic drawing of a gain clamped dual stage amplifier with two over pumped short erbium doped fiber length in accordance with this invention.

FIG. 4C is a graph of the output spectrum of FIG. 4A and FIG. 4B after an amplified signal passing through a gain flattening filter.

DETAILED DESCRIPTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art. For example erbium-doped amplifiers are described hereafter however other rare earth elements used in amplifiers can be used in place of erbium.

Figure 1A:
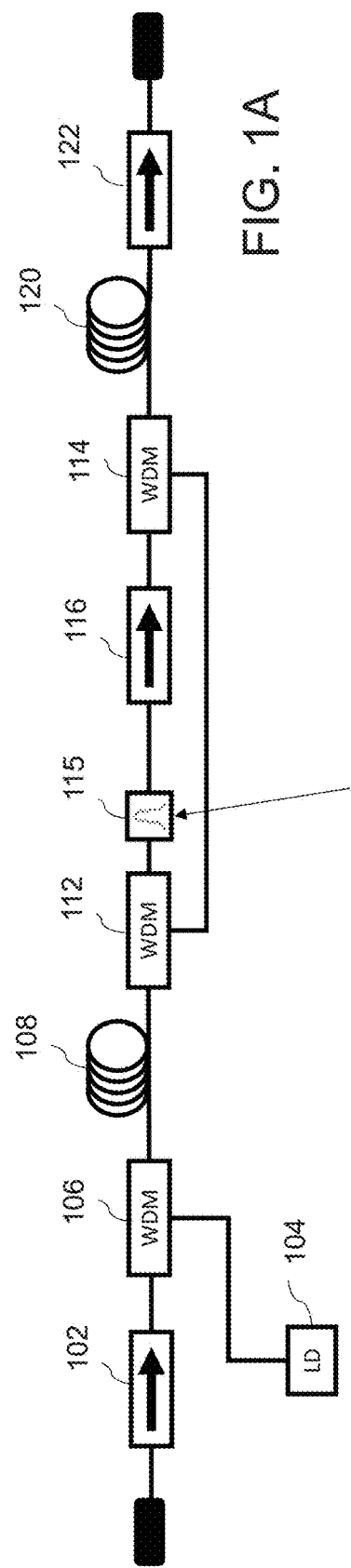
FIG. 1A is a schematic drawing of a conventional prior art amplifier with gain flattening filter.
Figure 1B:
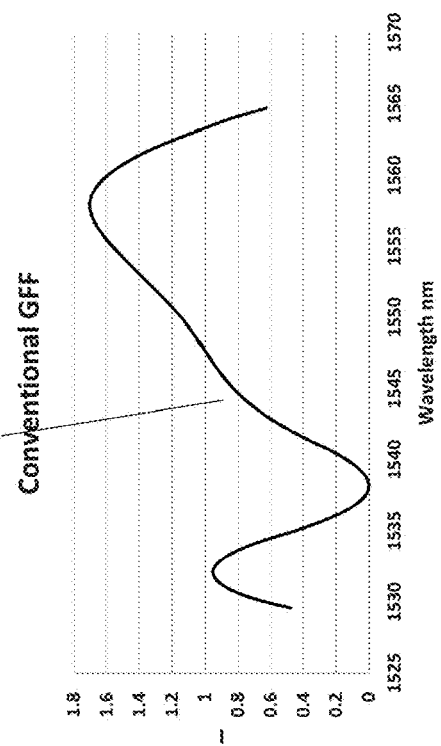
FIG. 1B is a graph of the conventional gain flattening filter response.
Figures 2A, 2B:
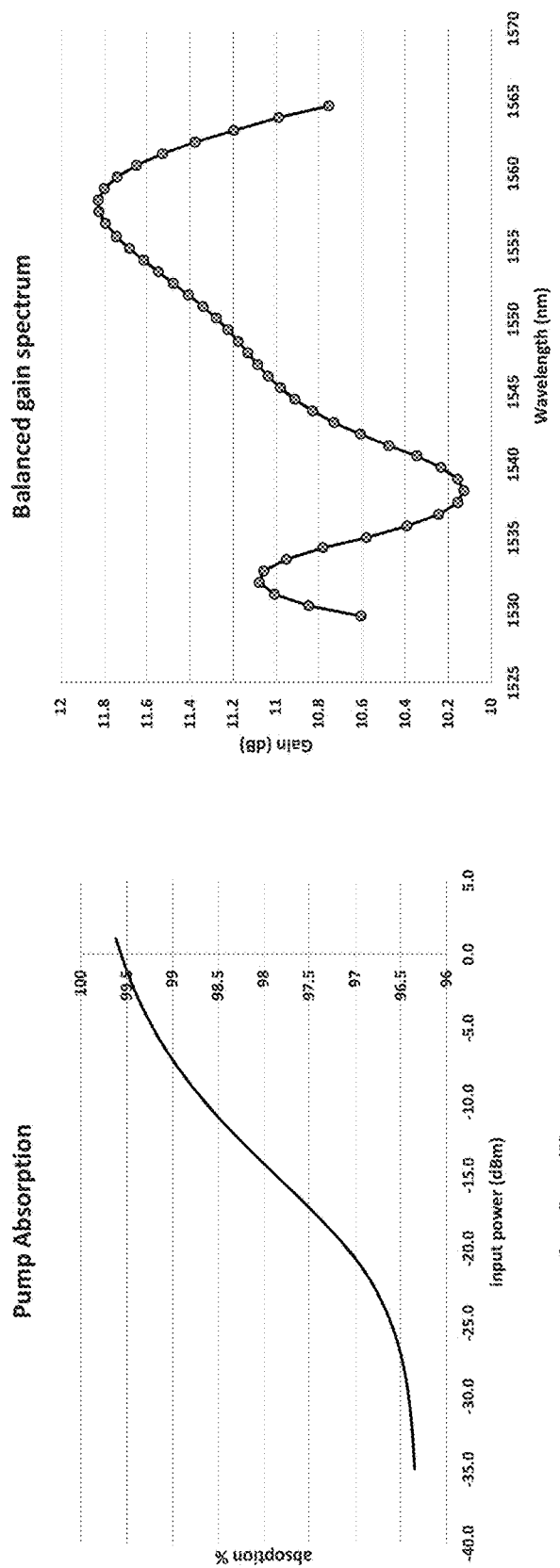
FIGS. 2A and 2B illustrates the pump absorption and gain spectrum of the prior art conventional amplifier of without a gain-flattening filter.
Figure 3:
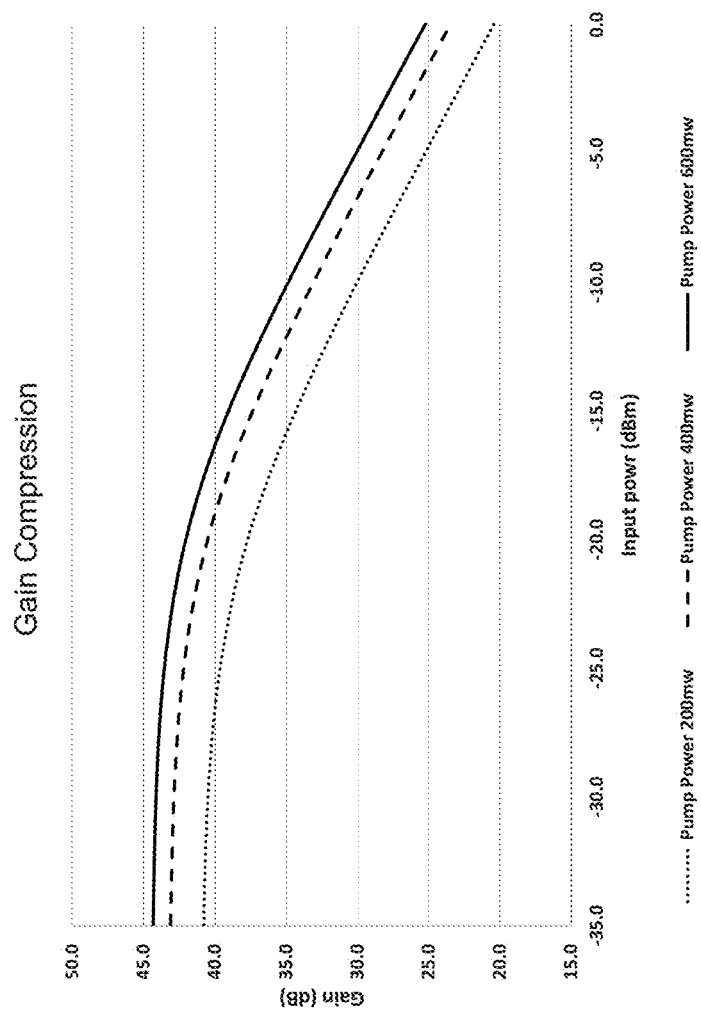
FIG. 3 illustrates the gain compression of the conventional amplifier of FIG. 1A.

Referring now to FIG. 1A an optical amplifier is shown having an isolator, 102, and laser diode optical pump 104 labeled LD coupled together by WDM 106. A length of EDF 108 is shown between WDM 106 and WDM 112. A third WDM 114 is shown and a gain flattening filter (GFF) 115 and an isolator 116 are disposed between WDMs 112 and 114. A second pumped length of EDF 120 further amplifies the signal passing through the amplifier and the signal then propagates through isolator 122. The purpose of the WDM 112 and WDM 114 is to allow the pump signal to bypass the filter 115 and be available to pump EDF 120. Conventional erbium doped fiber amplifiers (EDFAs) usually have relatively long erbium doped fiber (EDF) spans or lengths for balanced gain spectrum and have a high pump efficiency as shown in FIG. 1A and FIG. 2. These optical amplifiers operate in gain saturation mode. The pump power is fully absorbed and gain with constant pump power varies with different signal power resulting in gain compression. In this prior art amplifier constant gain is achieved by dynamically adjusting the pump power according to the signal power using feedback. Amplifiers of this type, as shown in FIG. 3 have strong gain compression with constant pump power; however the gain reduces significantly as the input power increases. This means that for a constant gain with varying input power, the pump power has to be changed and varied accordingly. Unfortunately unwanted gain over-shooting and under-shooting occurs during this pump adjusting. FIG. 1B shows the attenuation spectrum of the gain flattening filter (GFF) and shows that the gain is balanced.

Gain clamping to achieve constant gain with constant pump power can be realized by over pumping the EDF with pump power beyond which the EDF can absorb, even with the highest input power. In this instance, the population inversion of the dopant ions is about 100% and constant in a particular application input power range. In this instance, the gain remains constant when input signal power varies.

As mentioned, the pump efficiency is significantly lower than that in a conventional EDFA since there is a significant amount of unused pump power. Furthermore, the gain spectrum is unbalanced, wherein the gain at shorter wavelengths is much higher than the gain at longer wavelengths.

Turning now to FIG. 4A a gain clamped amplifier with an over pumped short erbium-doped fiber is shown. The length and doping of the erbium doped fiber is selected such that the gain is limited to 10 dB or about less than 15 dB. In FIG. 4A an input signal is launched into the input end of the amplifier and passes through isolator 102. This signal with a constant pump light from LD 104 is multiplexed by WDM 106 into the short span of EDF 408. The term "constant non-varying pump light" is to mean that when the amplifier is in operation, the pump provides a substantially unvarying output power. In FIG. 4A, the pump provides light of sufficient power to oversaturate the EDF 408. WDM 415 allows any remaining pump light to be separated from the amplified signal, and GFF 420 provides gain flattening to the amplified signal. The dual-stage amplifier shown in FIG. 4B works in a similar manner. In this circuit an input signal traverses the isolator 102 and WDM 106 where the pump signal is combined with the input signal. One difference in this circuit is that the pump light is separated from the once amplified signal and bypasses the GFF 420 and isolator 424 after which, it is multiplexed back with the amplified signal by WDM 422. The once amplified signal and remaining pump signal are provided to the short span of EDF 418 where a second amplification of the input signal occurs. Both EDFs have a length and doping concentration such that no more than about 10 dB to about 15 dB of amplification occurs at each stage. WDM 430 is provided to remove any remaining pump signal.

The gain-flattening filter shown in FIG. 4A and FIG. 4B is provided to flatten the gain spectrum and the amplifier operates in the absence of feedback to control the pump which outputs a constant non-varying output signal requiring little if any output control circuitry. However, disposing a GFF in between two EDF segments results in less than an ideal noise figure performance because there is high loss at short wavelengths. Disposing the GFF after all EDFs results in good noise-figure (NF) performance but further reduces pump efficiency. One concern, is the in manufacturing of GFF with such a high insertion loss peak. Embodiments, which follow, address these concerns and are preferred.

Figures 4D, 4E:
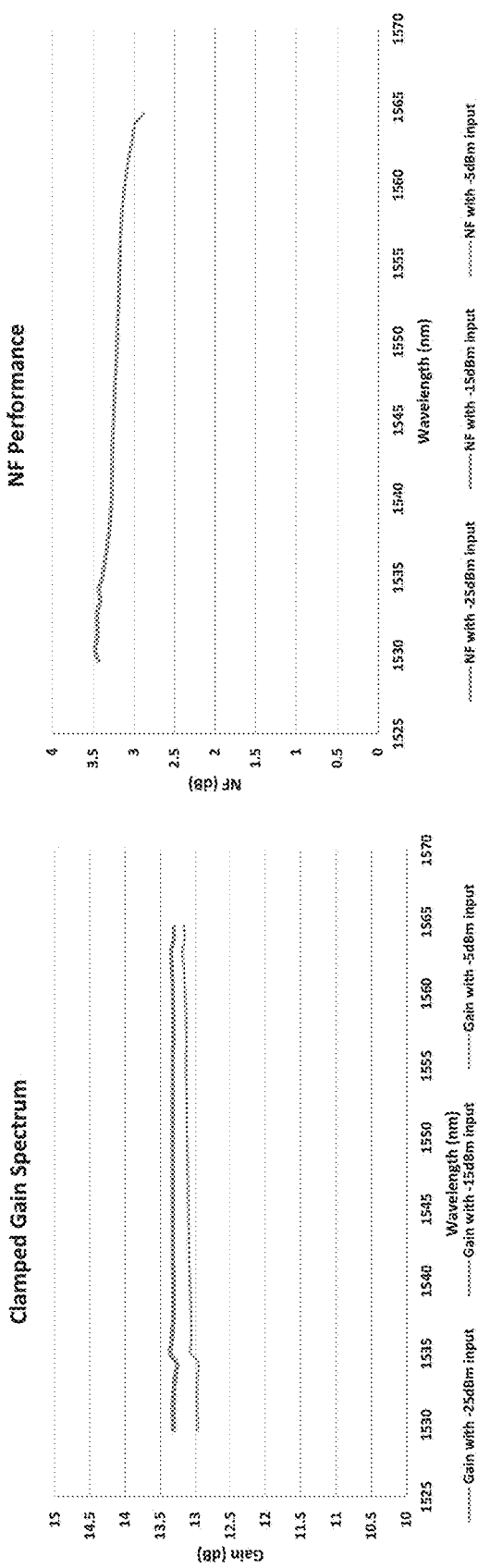
FIGS. 4D and 4E are graphs of the clamped gain spectrum and noise figure of the amplifier of FIG. 4A.
Figure 4F:
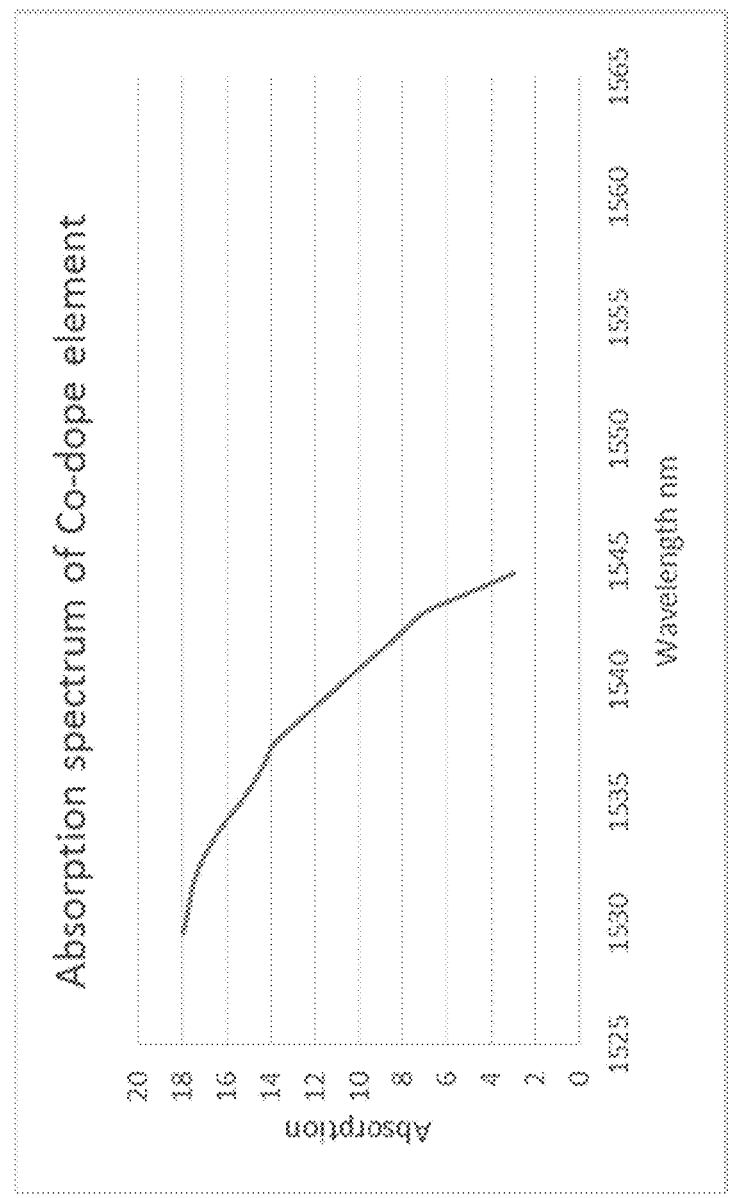
FIG. 4F is a graph of an ideal absorption spectrum of a co-doped element.
Figure 5:
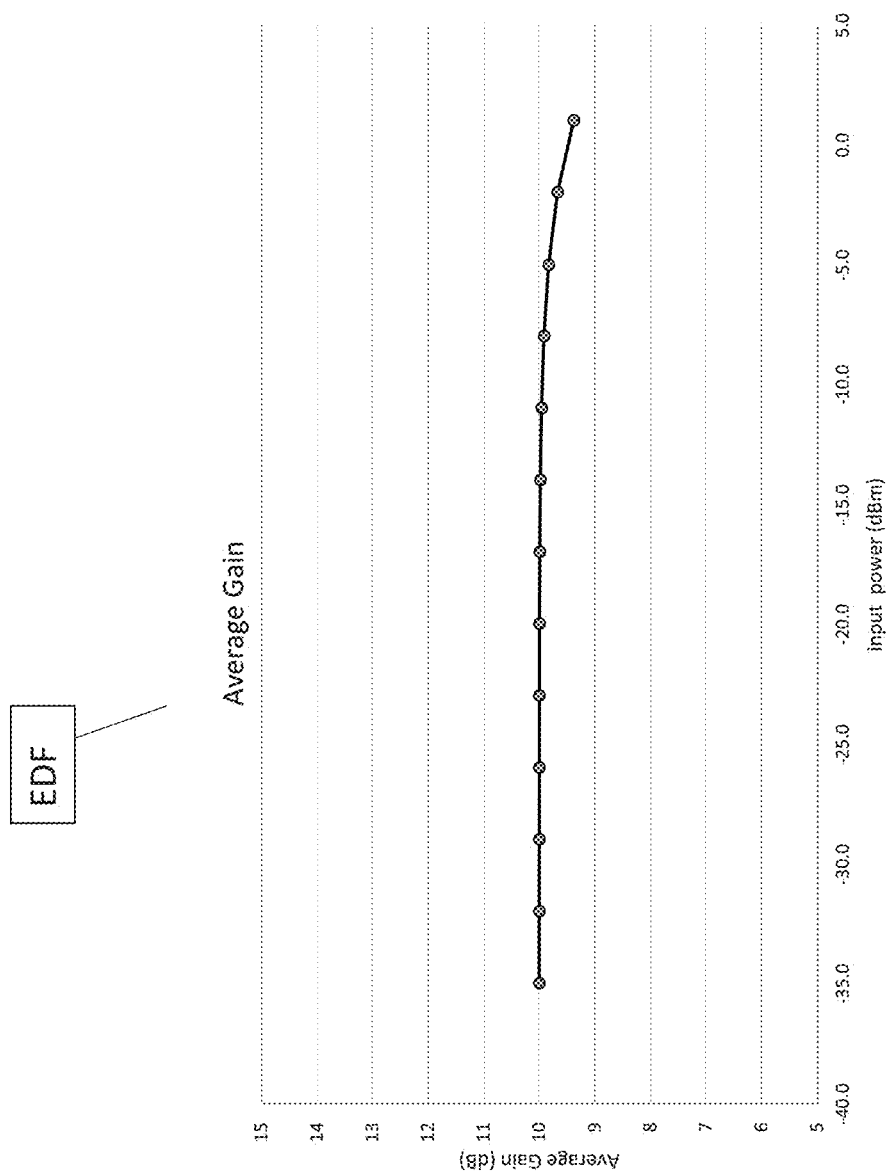
FIG. 5 is a graph depicting the gain compression of the amplifier of FIG. 4A and FIG. 4B with an over pumped short span of erbium-doped fiber.

With regard to the operation of the amplifiers shown in FIG. 4A and FIG. 4B and referring as well to FIG. 5, when a relatively short span of EDF and higher pump power than is typically provided in a typical span of EDF is used, the amplifier is in a pump saturation state wherein the population inversion is relatively constant with different signal input power within a reasonable operating range, so that gain clamping is achieved. In this system, gain over and under-shooting is essentially eliminated with no closed-loop feedback pump control required. The pump is simply set to a constant non-varying power sufficient to provide at least a full population inversion of the EDF lengths.

One of disadvantages of this over pump mechanism is that the gain spectrum is unbalanced; that is, the gain for different wavelengths varies, as shown in FIG. 4C, which illustrates that the gain at short wavelengths is significantly higher than the gain for longer wavelengths of light.

With a conventional single gain-flattening filter, the noise-figure (NF) at short wavelengths is typically too high to be acceptable or the pump power consumption is overly limited. Although the embodiments shown in FIGS. 4A and 4B are less preferred embodiments of the invention due to the aforementioned limitations, with a full population inversion, they function well if the target gain is not too high, for example, less than 10 dB or in some instances less than up to 15 dB. In this instance a conventional GFF is used.

MP980 optical amplifying EDF is commercially available from OFS Optics having absorption of 6.5 dB/m. Optical fiber for lasers can be obtained having a very high absorption up to 150 dB/m. In a saturation pumped condition, the gain is proportional to the fiber length. Therefore to have 10 dB gain at long wavelength, the fiber length should be approximately 3.5 meters in length using MP980 EDF.

Turning now to FIGS. 4D and 4E, the gain spectrum and noise figure performance is shown in the graphs. In FIG. 4D it can be seen that the gain spectrum of the amplifier does not change significantly with input power and the amplifier is gain clamped. Even when the input power reaches −5 dB, the gain spectrum changes less than 0.3 dB.

Figure 6:
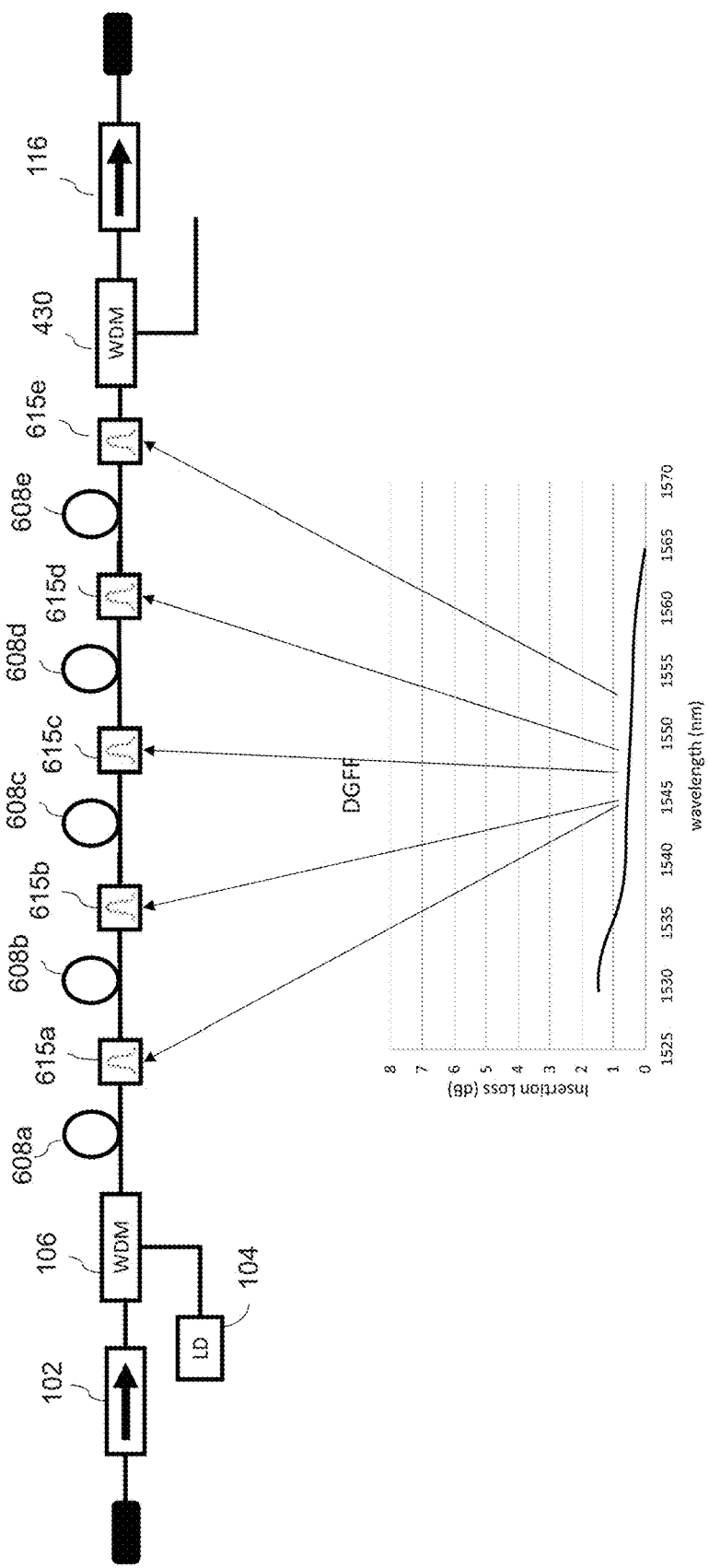
FIG. 6 is a schematic drawing of a gain clamped amplifier with a distributed gain-flattening filter arrangement in accordance with this invention.

In a preferred embodiment shown in FIG. 6 an EDFA with a distributed GFF is used. The amplifier consists of serial short EDF amplifying stages 608a, 608b, 608c, 608d, and 608e separated by distributed GFFs (DGFFs) 615a through 615e. In one embodiment multiple EDF segments are used followed by a low peak GFF as is shown in FIG. 6. The distributed GFF peak insertion loss can be reduced to 1/N, where N is the number of the EDF segments. FIG. 6 illustrates the use of a DGFF eliminating or lessening insertion loss, but the cost may be prohibitive.

Figure 7:
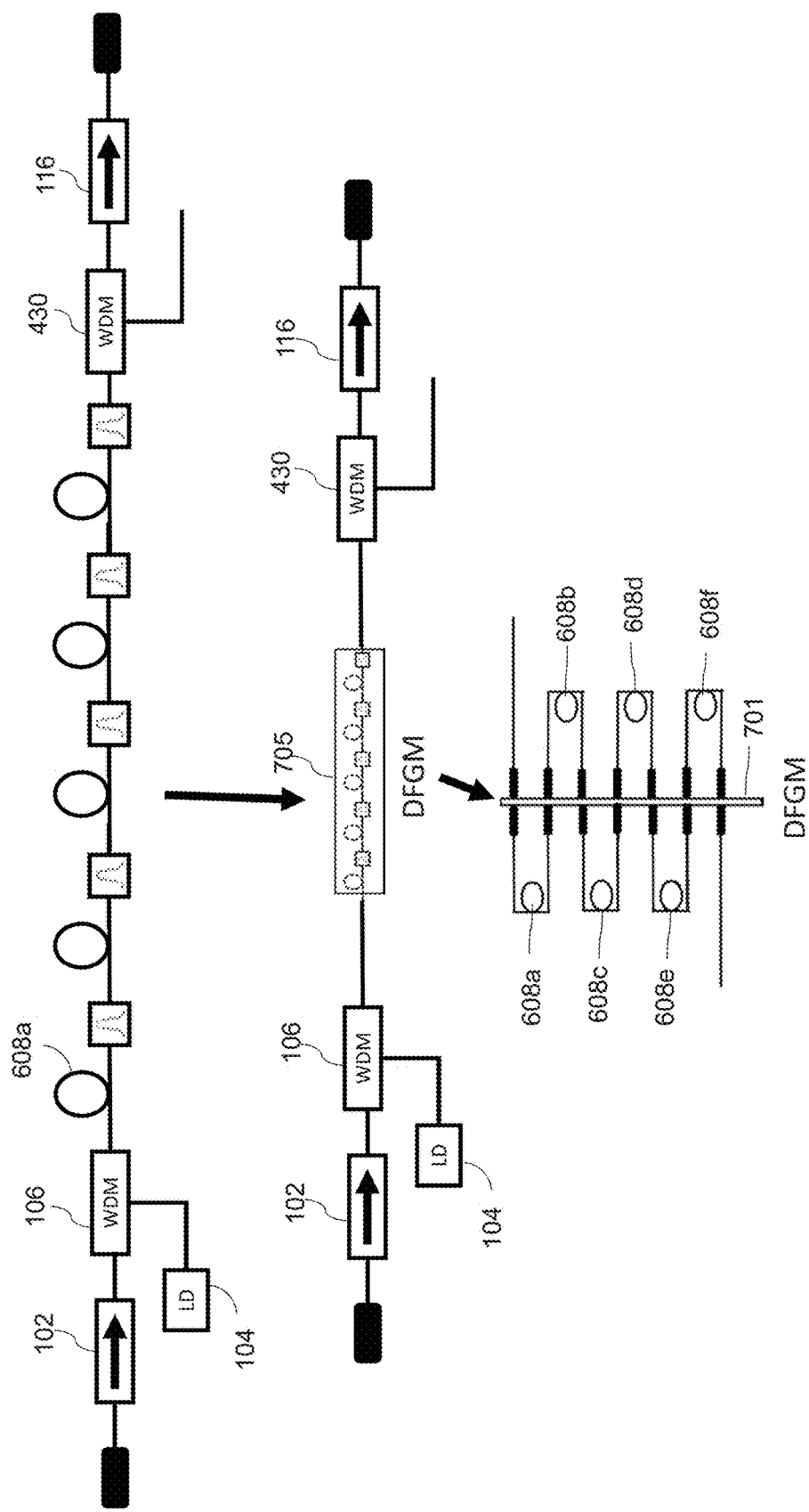
FIG. 7 is a schematic diagram illustrating how the embodiment shown in FIG. 6 is realized in a distributed flattening gain medium (DFGM) embodiment.

FIG. 7 shows a series of three drawings from top to bottom illustrating the dynamic gain flattening filter (DGFF)

component design. A portion of the upper drawing, elements 608*a* through 615*e* are shown as block 705, which is embodied by a serial coupling of short EDF sections having a distributed gain flattening medium DFGM 701. By using shorter spans of EDF and gain flattening filters or a DFGM after/between each short amplifying section of EDF, each amplifier providing less amplification than a single longer section of EDF, a same amplification can be achieved with a significantly lesser noise figure. In this amplification scheme the pump provides a continuous pump power that will oversaturate the first amplifier and at least fully saturate or oversaturate serial inline subsequent amplifiers. Short amplifying sections of EDF 608*a* through 608*f* are shown coupled to the DFGM 701. The same filter element provides filtering after each short amplifying section of EDF.

Figure 7A:
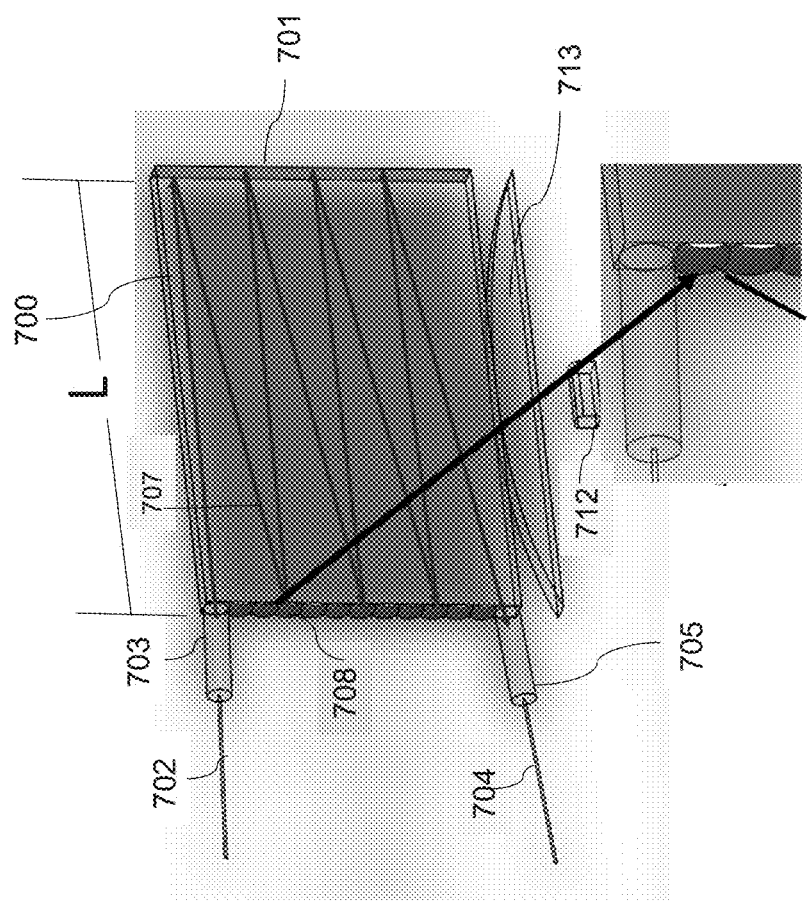
FIG. 7A is a perspective drawing of an integrated multi-stage amplifier in accordance with an embodiment of the invention.
Figure 7B:
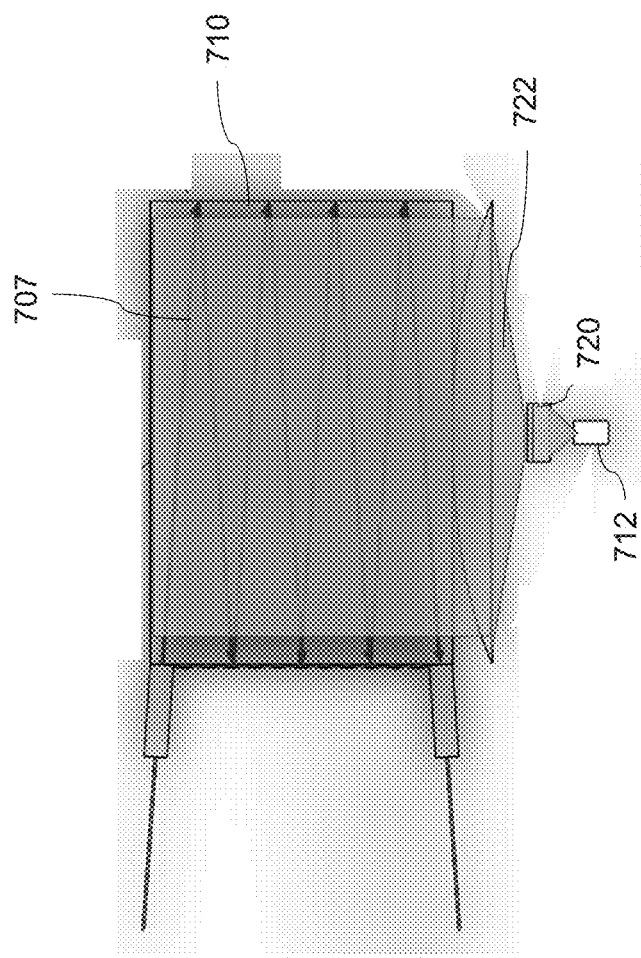
FIG. 7B is a perspective drawing of an integrated multi-stage amplifier using two cylindrical lenses to widen the pump light in accordance with an embodiment of the invention.
Figure 7C:
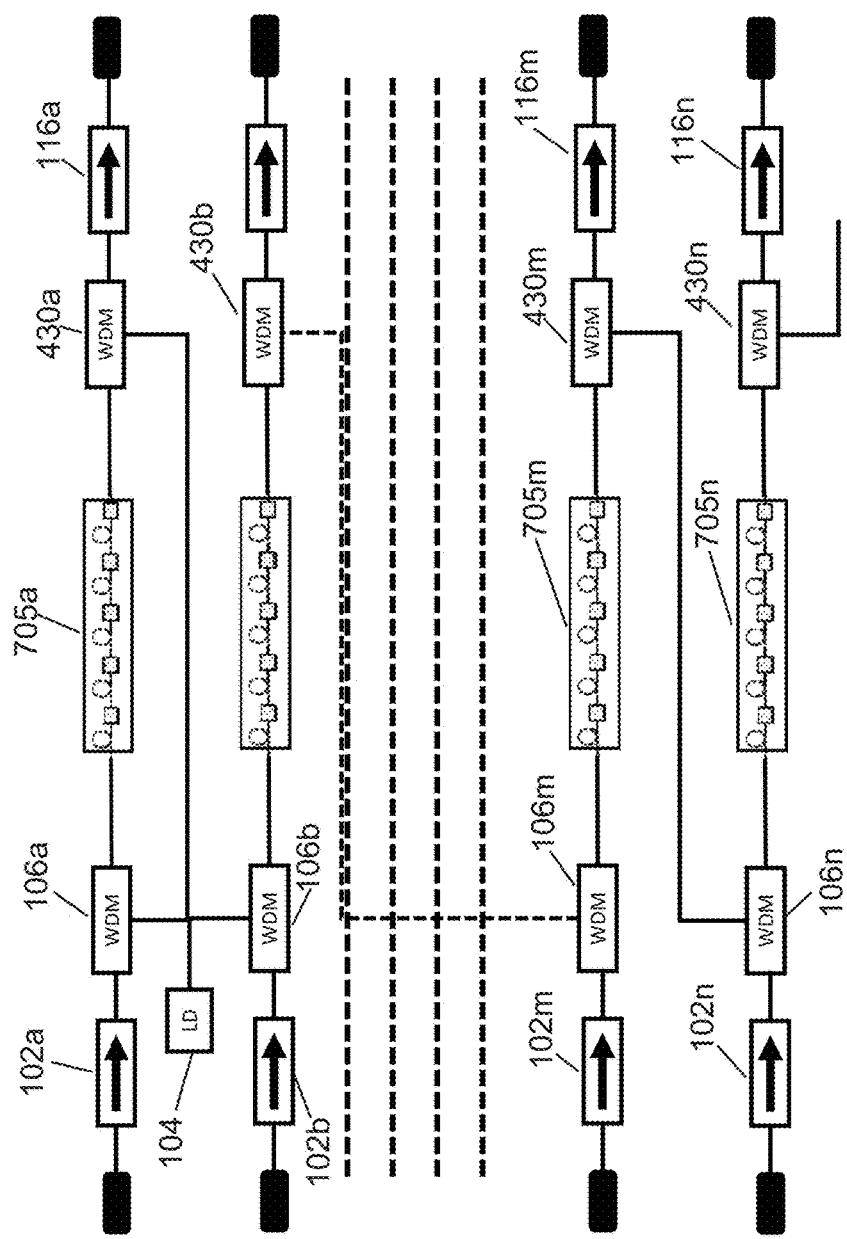
FIG. 7C is a schematic diagram of an amplifier array based on using a single saturation pump.
Figure 7D:
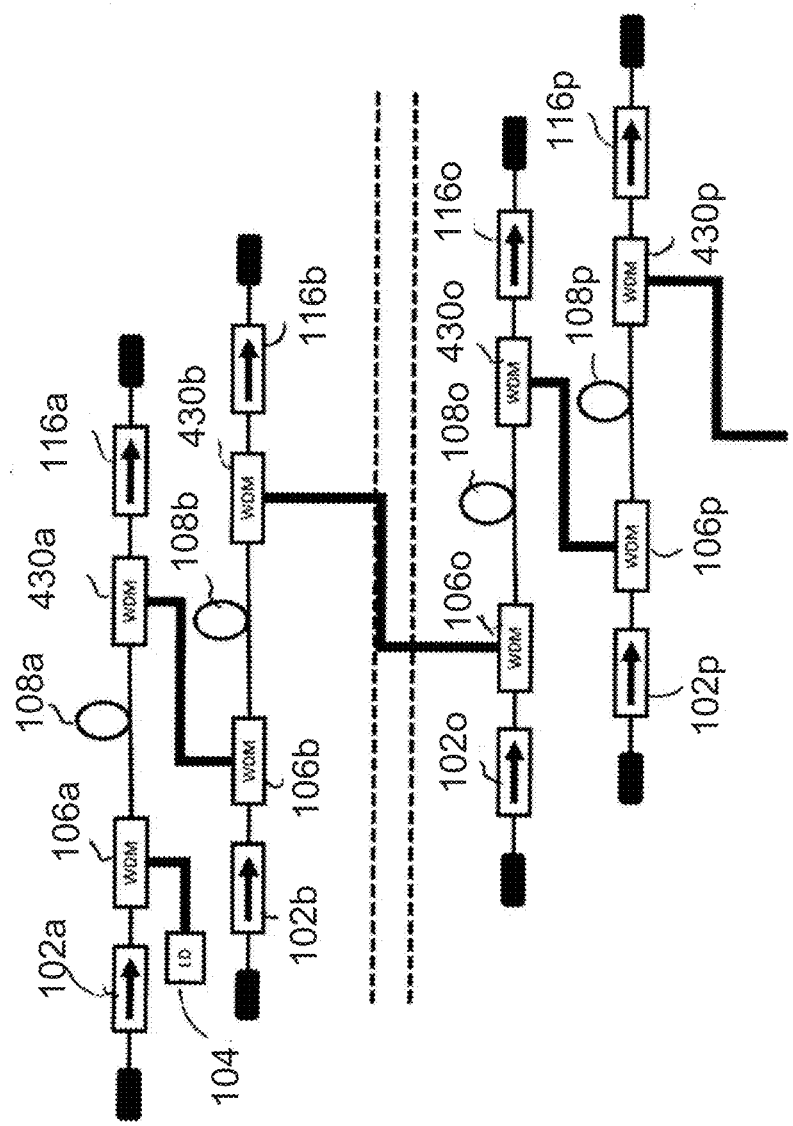
FIG. 7D is a schematic diagram of an amplifier array based on using a single saturation pump.
Figure 7E:
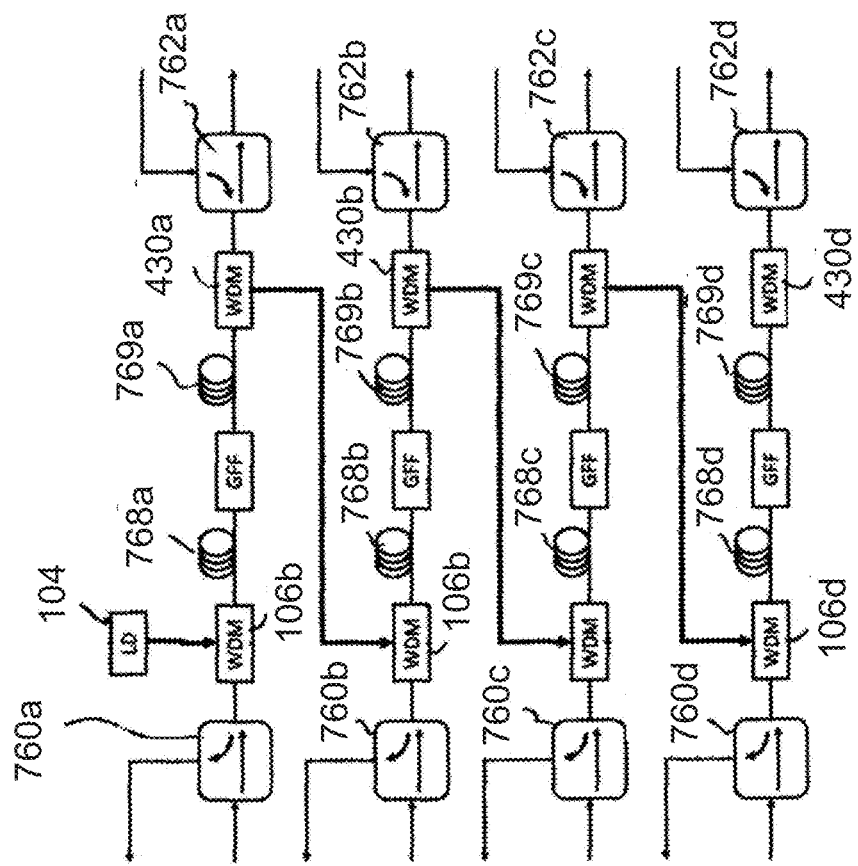
FIG. 7E is a schematic diagram of an array of serially pumped amplifiers pumped by a single pump laser.
Figure 7F:
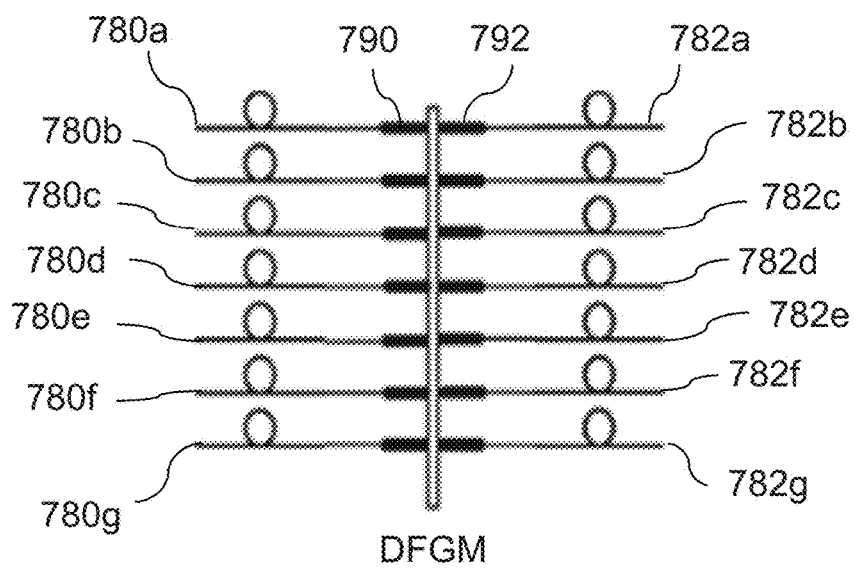
FIG. 7F is a schematic diagram of a distributed gain flattening medium (DFGM).

FIG. 7F is a variant of the DFGM described heretofore. Input erbium doped waveguides 780*a* through 780*f* are optically coupled through grin lenses 790, 792 to output erbium doped waveguides 782*a* through 782*f* respectively. The amplifying fibers are of a length and doping concentration such that no more than 15 dB of amplification is provided when an optical signal to be amplified passes through each erbium doped amplifying waveguide. A constant output power is used to pump these fibers so that the amplifying fibers are fully saturated.

FIG. 7A is a variant of the embodiment shown in FIG. 7 wherein a rare earth doped block of light transmissive material, preferably glass, provides an amplifying medium for a beam launched therein to propagate along a path in free-space within the block. The embodiment is shown in greater detail n FIG. 7B. The rare earth doped glass block 700 has an input end having an input optical fibre 702 for launching an optical signal to be amplified coupled to a collimating lens, such as a graded-index (GRIN) lens 703 for transforming the input signal light propagating in the optical fiber 702 into a collimated beam. A reflecting film 701 is coated upon an opposite end face. If the block is much wider than the beam, the beam will essentially propagate in free-space within the block unconfined by the block itself. However if the block is narrow enough, the block air interface outside the block will act as a guide for the light thereby being confined by the refractive index difference between air block interfaces. This also holds true for the pump light propagating within the block. At an output end of the light transmissive block 700 output optical fibre 704 coupled via a collimator 705 receives the amplified output signal. In FIG. 7A signal light propagating into the block 700 confined within fiber 702 is collimated by graded index (GRIN) lens 703 and is shown as a light path 707 which is reflected back and forth in a zig-zag pattern N times reflecting from surface 701 and array of reflectors 708 and the signal is amplified N times by traversing the pumped doped glass before exiting and being refocused by the collimator 705. The gain for each round trip is $$g_1, g_2, \ldots g_N$$

where the total gain is:

$$G = \sum_{i=1}^{N} g_i$$

Since the erbium doped ions are in saturation, the gain of each round trip is same, so that:

$$G = N g_{rt}$$

Wherein the gain of each round trip is proportional to the length of the glass block and the doping density:

$$g_{rt} \propto LD$$

Therefore a high doping density is preferred, otherwise the required length of the glass block will be too long to be practicable and too many reflections will be required to achieve a desired amplification. Very high doping densities are achievable, and co-doping with Er/Yt doping allow L to be short, for example, 10 mm. Commercially available EDF is available at 150 dB/m and Er/Yt co-doped optical fiber is available rated at up to 3000 dB/m Reflectors 708 can be a concave mirror array or a flat reflecting surface depending on the particular requirement. If the doping density is not high enough and more round trips are required, the light may need to be re-focused so that all light power can be collected by the output fiber collimator. In this instance the reflecting surfaces can be made as concave mirrors or refocusing mirrors. Alternatively if the doping density is sufficient, the reflecting surface may be a flat surface.

In FIG. 7A light from pump laser 712 is directed into a cylindrical lens 713 for distributing the pump light uniformly through the glass block 700. In some instances a mirror can be used instead of a lens. Since the glass block 700 is doped substantially uniformly throughout, any optical path taken by the signal light propagating therethough in a zig-zag fashion will be amplified as the erbium ions are saturated by the 980 nm wavelength pump light.

As is shown in FIG. 7B, an opposite end of the glass block 700 is a reflecting gain flattening filter 710. A pump laser 712 is coupled to the glass block via cylindrical lens 720 and cylindrical lens 722. In this embodiment pump light is widened by the cylindrical lens and is perpendicular to the signal light. A multimode pump laser with a high output power can be used. The minimum power of a multimode pump laser is approximately 6 watts and pump lasers are available that provide tens of watts. Within the light transmissive rare earth doped block 700 is a path shown 707 followed by the input beam as it traverses the block 700 in a zig-zag optical path shown more clearly in FIG. 8. A path followed by the collimated beam defines a plurality of amplifying optical paths, separated by a gain flattening filter at an end face of the block. The concave mirrors refocus the beam and maintains the beam size. The reflecting film is designed to have lower reflection for the wavelengths that have higher gain, and thus serves as a gain-flattening filter. Since the beam has a length, i.e. the length it traverses on each pass through the block, and the beam has a diameter, i.e. the diameter of the cross-section of the collimated beam, this defines a light amplifying path of a single amplifier in this array of amplifiers, separated by filters. One may think of the swath cut by a beam traversing the free-space region of the block as an amplifying region, however confinement is not defined by a waveguide; in this instance it is a function of the beam being collimated and moving through the free-space of the material as a collimated beam.

Turning now to FIGS. 7C, 7D, and 7E, embodiments are shown wherein a single high power laser diode pump provides constant non-varying light to amplifying sections advantageously without the requirement of a feedback loop for pump control similar to the other embodiments of this invention. FIG. 7C shows an amplifier array using a single saturation pump. Elements 102*a*, 106*a*, 705*a*, 430*a*, and 116*a* are the same as elements described heretofore, bearing numerals 102, 106, 705, 430, and 116 and indices "a" through "n" simply indicate n inputs through same optical elements. It is notable that in FIG. 7C the pump signal provided by laser diode 104 is extracted at WDM 430a and is routed into input b of the amplifying array for amplifying the $b^{th}$ input signal. As can be seen, the pump signal is removed and cycled down to each subsequent input line of the amplifying array. In this manner n input signals are amplified and filtered by n DGFF+EDF modules 705a through 705n. The term oversaturation can perhaps be best understood in this regard, since the constant power pump signal must have more than required output power to fully saturate the EDF within 705a if it is to fully saturate the EDF within 705n since it is the remaining unused tapped 980 nm pump light that is directed to a next amplifying input line from the $a^{th}$ to the $n^{th}$.

FIG. 7D is another illustration of a similar amplifier wherein a single short loop of EDF is used for each amplifier. Elements "a" through "p" are same elements shown heretofore without indices "a" through "p". The amplifier array has a single saturation pump 104, which is fed down to other amplifying lines in the array by WDM "a" through "o". This amplifier is for single channel applications wherein the amplifying array of FIG. 7C is for multichannel input signals.

FIG. 7E shows another embodiment of the invention wherein a single pump 104 is provided and where each of the amplifiers in the array of amplifiers is a bidirectional amplifier. Turning now to FIG. 7E, two-port optical circulators 760a through 760d are shown on the left side of the amplifier array and two-port optical circulators 762a through 762d are shown on the left side of the amplifier array. Similar to the other embodiments described heretofore, a single saturation pump providing a non-varying high power pump light 104 capable of fully saturating erbium ions within each EDF fiber is coupled into the array. Each optical circulator 760a through 760d and 762a through 762d provides a means in which to input an optical signal to be amplified and allows an amplified signal on another of the two ports to be output. Short EDF sections or spans 768a and 769a are separated by GFF filters, which gain-flatten signals propagating in opposite directions. EDF sections 768b 768c, and 768c and 769b, 769c and 769d similarly amplify signal propagating in opposite directions and respective GFFs provide necessary gain flattening. WDM filters provide the same function of allowing the pump signal to be combined with the signal to be amplified and are used for removing excess pump light to be routed to another of the amplifiers in the array.

Figure 8:
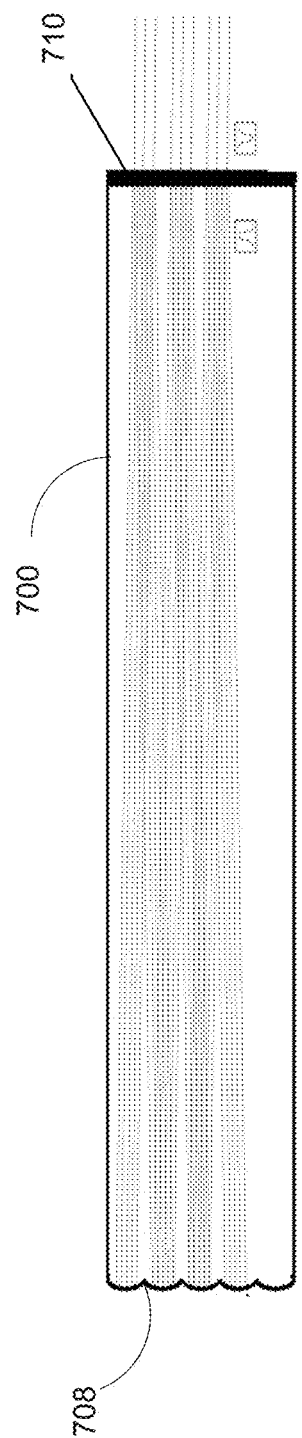
FIG. 8 is a top view in cross section of the glass block amplifier shown in FIGS. 7A and 7B.
Figure 9:
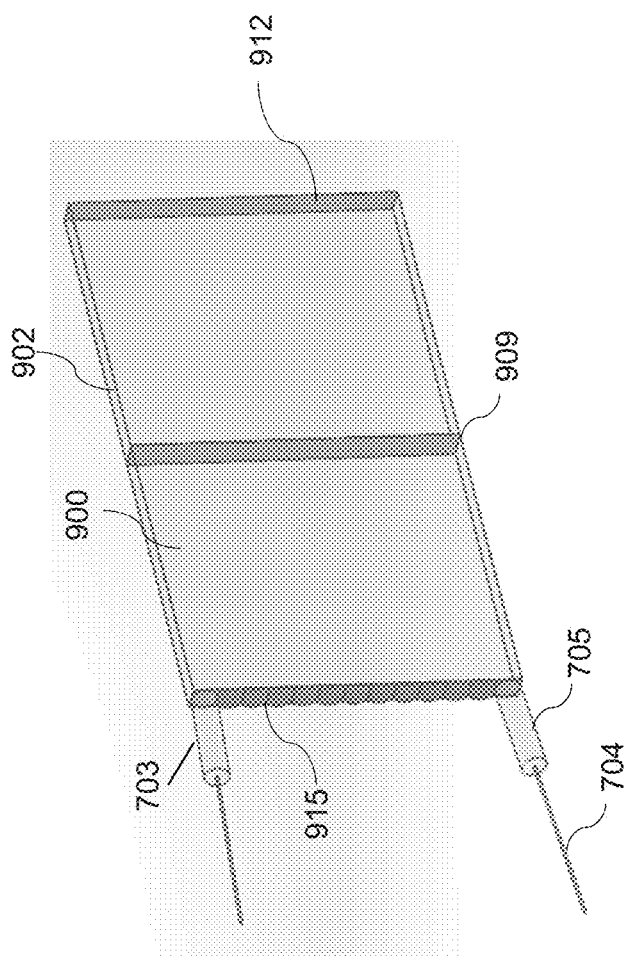
FIG. 9 is an isometric drawing of an amplifying module having a gain flattening filter between two glass blocks.

An alternative embodiment sharing some similarities to the amplifying glass block 700 of FIGS. 7A, 7B, and FIG. 8, is shown in FIG. 9. In this amplifying module, however, a gain-flattening filter 909 is disposed between glass block 900 and glass block 902 and a reflective coating 912 is shown on an end face of block 902. A plurality of amplifying lengths defined by the internal zig-zag path of the input beam launched from collimator 703 is, in part, defined by the reflector array of mirrors 915 which fold the beam incident thereon, back to an opposite side at a different location than a last folded beam. Reflectors 915 are disposed between the input fiber 702 and output fiber 704 and refocus the beam of light incident thereon so that the beam remains substantially collimated. Reflecting surface 912 ensures the beam incident thereon is reflected back to a different location on array 915. It should be understood that the block might have different forms. For example it is possible to provide some amplifying lengths longer than others by providing a block of a different shape. The length across the blocks may vary by using a stepped block. The term block used herein is not confined to a rectangular block. Other shapes of blocks may be used.

Figure 10:
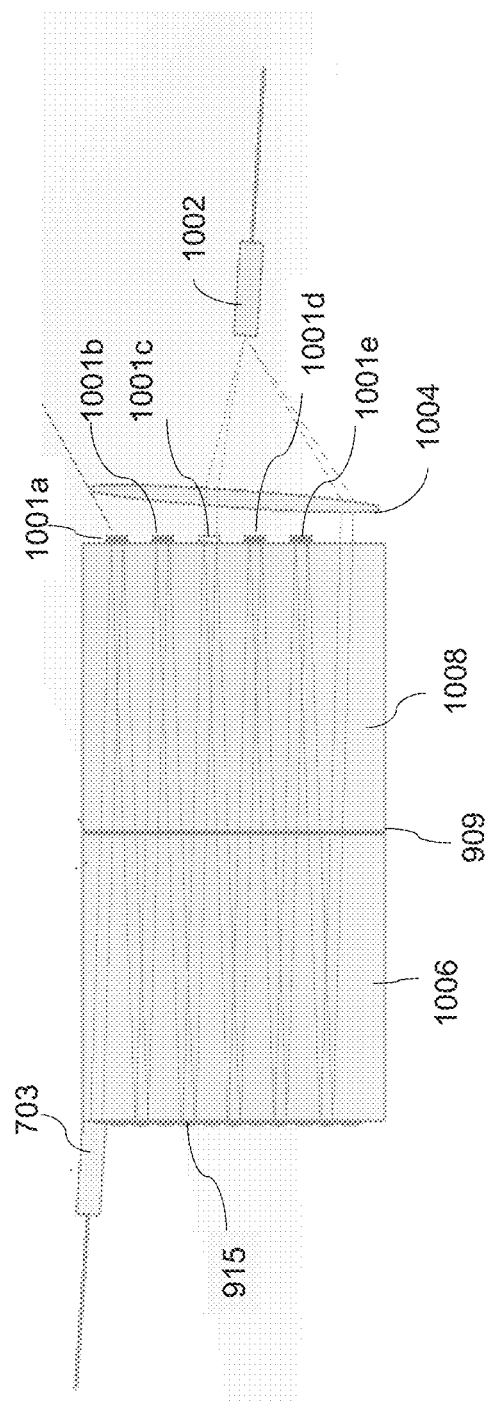
FIG. 10 is a side view of a bi-directional amplifying module having a gain flattening filter between two glass blocks.

Turning now to FIG. 10 a two-block construction 1006, 1008 of a free-space amplifying module is shown. However, the amplifying module of FIG. 10 is a variable gain amplifier. The left of FIG. 10 shows a linear array reflecting concave recollimators optically coupled to the block 1006. However, on the right of block 1008 is a spaced array of micro-electromechanical (MEMs) reflecting/transmissive shutters 1001a, 1001b, 1001c, 1001d and 1001e. In one embodiment the MEMs shutters may be thermally activated or in another embodiment they may be electrostatically actuated. In operation, signals launched into the amplifier through collimator 703 exit the amplifier through collimator 1002 after passing through shutter 1001e which is shown open so as to pass light therethrough and subsequently passing through lens 1004. When more passes through the amplifier are desired for increased amplification, shutter 1001e is closed and one of shutters 1001c or 1001d is opened or in a transmissive state.

In all of the embodiments described heretofore, gain balancing can be achieved by co-doping the amplifying waveguides or block with ytterbium.

Figure 11:
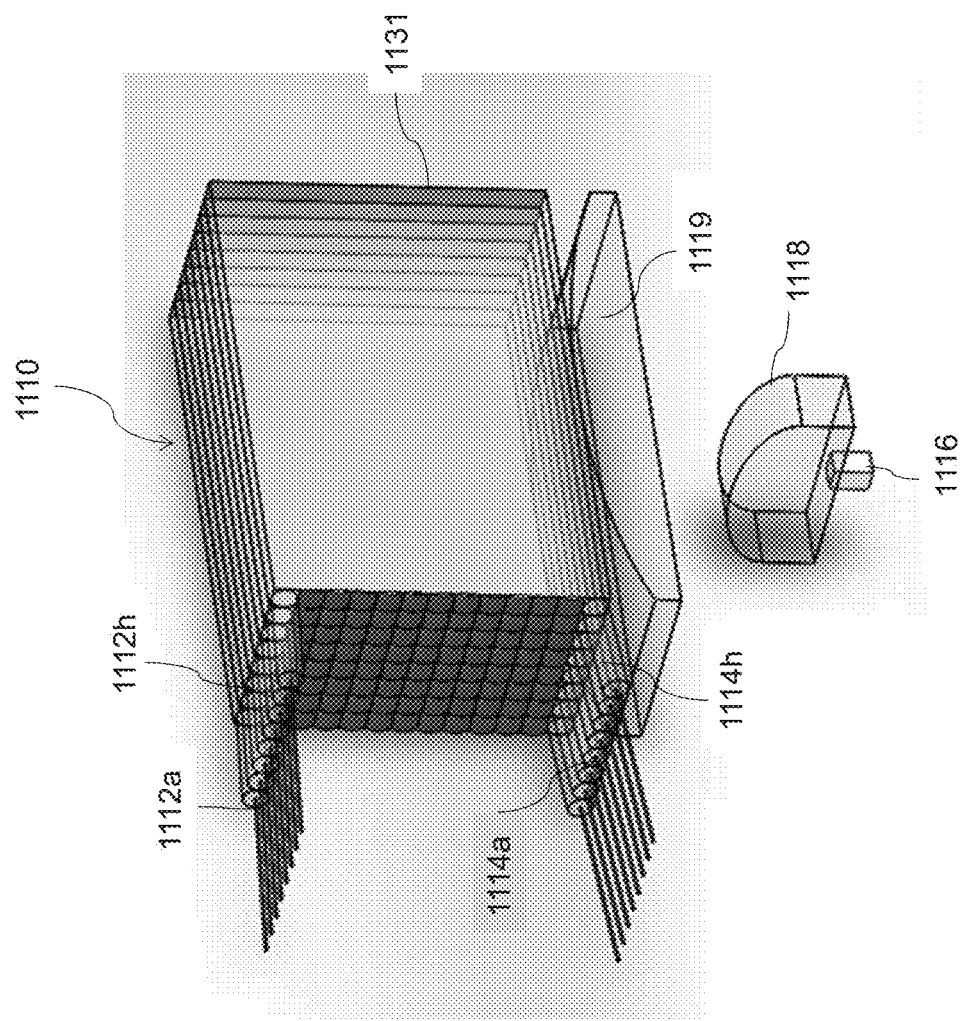
FIG. 11 is an isometric view of an arrayed optically amplifying module having 8 input ports and 8 output ports shown in FIG. 7

Turning now to FIG. 11 an amplifying module is shown having 8 input ports 1112a through 1112h and 8 output ports 1114a through 1114h. On the backside face of the block 1110 is a gain flattening filter 1131 which reflects a gain flattened beam incident thereon backward to a reflecting surface on the input end face. In operation a beam entering the amplifier at 1112a is reflected in a zig-zag fashion 11 times thereby making 24 passes through the rare earth doped amplifying medium 1110 and being gain flattened each time the beam impinges upon the back face. Pump laser 1116 and lenses 1118 and 1119 provide a beam having power that will ensure that the erbium ions within the block 1110 are fully saturated. Each of the remaining ports function similarly in the array.

Figure 12:
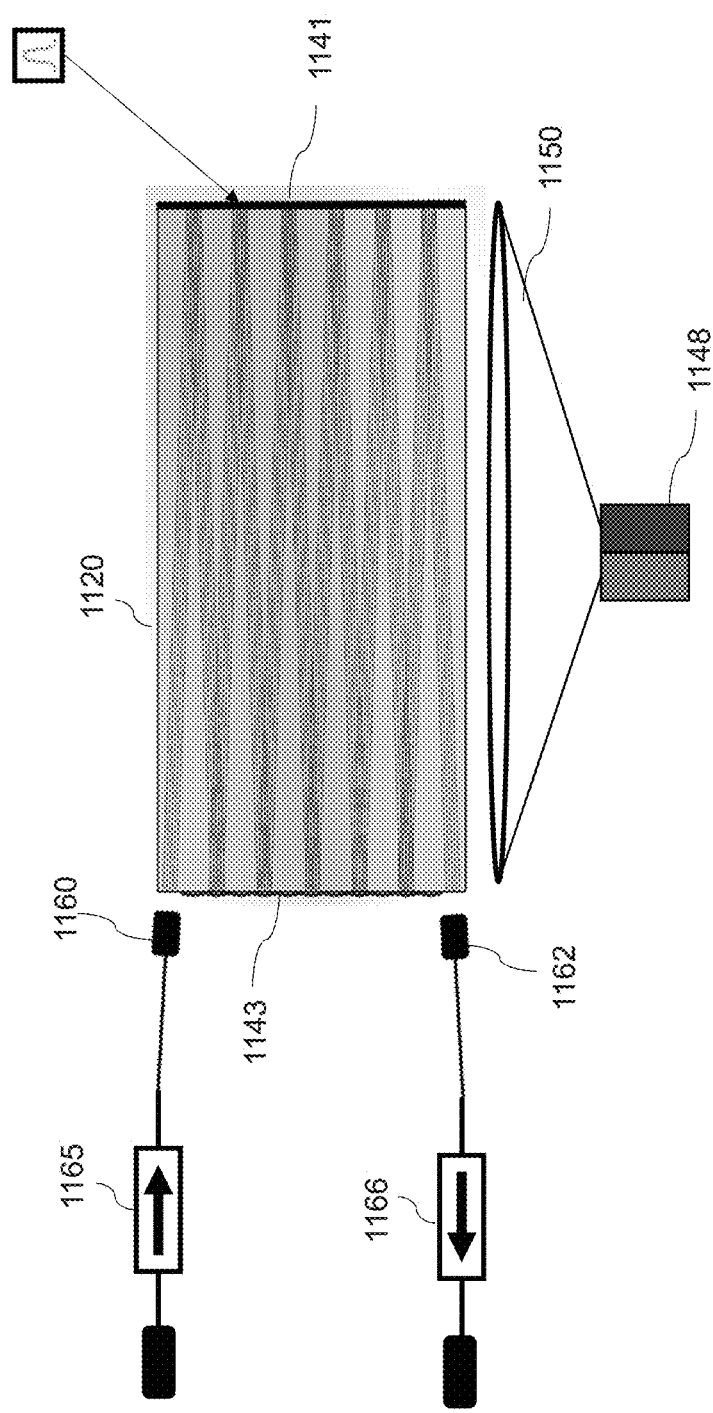
FIG. 12 is a side view of a transverse pumped optical amplifier.

FIG. 12 shows a transverse pumping scheme as opposed to the vertical pumping schemes shown heretofore, for example in FIG. 11. A light transmissive erbium doped glass block 1120 co-doped with Yt has a thin film GFF filter 1141 on an end thereof and has refocusing beam shaping lenses 1143 on an opposite end. Isolators 1165 and 1166 ensure one way light propagation into and out of the block 1120. GRIN lenses 1160 and 1162 provide collimation and focusing light into and out of the block, respectively. Transverse pump 1148 and lens 1150 provides parallel pumping and a smaller form factor since the pump can be disposed in the space taken by the collimator. For example if the input and output ports are on the same side of the glass block, the pump laser and lens can be disposed between the input/output fibers and collimating lenses. Complexity is increased in that the thin film coating at the glass end must be designed to reflect the signal wavelength of 1550 nm and pass the pump light of 980 nm.

Numerous other embodiments may be envisaged without departing from the spirit and scope of the invention.

What is claimed is:

1. An amplifying module for amplifying one or more optical signals when coupled to a pump signal, comprising:
   a gain flattening filter;
   "n" amplifying optical waveguides doped with rare earth ions for amplifying one or more optical signals propagating therethrough in the presence of pump light, said "n" amplifying optical waveguides optically coupled to the gain flattening filter, wherein the "n" amplifying optical waveguides are arranged in n/2 pairs, wherein each amplifying waveguide within a pair is on an opposite side of the gain flattening filter from the other amplifying waveguide in the pair, wherein when signal light to be amplified is launched into an amplifying waveguide of each pair in the presence of pump light, some of said amplified signal light is attenuated by the filter and remaining amplified signal light is passed to the other amplifying optical waveguide in said pair, wherein n is equal to or greater than 4.

2. The amplifying module as defined in claim 1, wherein at least some of the n amplifying optical waveguides, have a length and rare earth doping concentration that will produce less than 15 dB of amplification of the one or more optical signals propagating therethrough when a pump signal provides a full population inversion of the rare earth ions, and wherein n/2 pairs of the amplifying waveguides are arranged in series.

3. The amplifying module as defined in claim 1, wherein the n amplifying optical waveguides, each have a length and rare earth doping concentration that will produce less than 15 dB of amplification of the one or more optical signals propagating through each of the n amplifying waveguides when a pump signal is present providing a full population inversion of the rare earth ions in each of the n amplifying waveguides.

4. The amplifying module as defined in claim 3 wherein the amplifying optical waveguides are erbium doped fibers and wherein the amplifying module further comprises at least n lenses for coupling the rare earth doped optical fiber to the gain flattening filter.

5. The amplifying module as defined in claim 4 further comprising a pump configured to provide a pump light having a non-varying output power.

* * * * *